(12) United States Patent
Floete et al.

(10) Patent No.: US 12,068,671 B2
(45) Date of Patent: Aug. 20, 2024

(54) ELECTRIC MOTOR

(71) Applicant: Metabowerke GmbH, Nuertingen (DE)

(72) Inventors: Enrico Floete, Stuttgart (DE); Matthias Hiller, Altenriet (DE); Thomas Stenzel, Ostfildern (DE)

(73) Assignee: METABOWERKE GMBH, Nuertingen (DE)

( * ) Notice: Subject to any disclaimer, the term of this patent is extended or adjusted under 35 U.S.C. 154(b) by 336 days.

(21) Appl. No.: 17/604,877

(22) PCT Filed: Apr. 28, 2020

(86) PCT No.: PCT/EP2020/061740
§ 371 (c)(1),
(2) Date: Oct. 19, 2021

(87) PCT Pub. No.: WO2020/225028
PCT Pub. Date: Nov. 12, 2020

(65) Prior Publication Data
US 2023/0105337 A1    Apr. 6, 2023

(30) Foreign Application Priority Data

May 3, 2019    (DE) ..................... 10 2019 111 472.1

(51) Int. Cl.
*H02K 9/22* (2006.01)
*B25F 5/00* (2006.01)
(Continued)

(52) U.S. Cl.
CPC ............. *H02K 9/223* (2021.01); *B25F 5/008* (2013.01); *H02K 7/145* (2013.01); *H02K 21/14* (2013.01); *H02K 9/227* (2021.01)

(58) Field of Classification Search
CPC ........ H02K 9/223; H02K 7/145; H02K 21/14; H02K 9/227
(Continued)

(56) References Cited

U.S. PATENT DOCUMENTS 5,744,880 A    4/1998   Kudoh
2006/0226717 A1  10/2006   Nagayma et al.
(Continued)

FOREIGN PATENT DOCUMENTS

CN    107508412 A  * 12/2017
CN    207039319 U    2/2018
(Continued)

OTHER PUBLICATIONS

Deutsches Patent-Und Markenamt, "Office Action Regarding Application No. 10 2019 111 472.1", Dec. 20, 2019, pp. 6, Published in: DE.
(Continued)

*Primary Examiner* — Jose A Gonzalez Quinones
(74) *Attorney, Agent, or Firm* — Neugeboren O'Dowd PC

(57) ABSTRACT

The present disclosure relates to an electric motor having a stator and a rotor. The rotor is fitted with permanent magnets which are surrounded by a rotor packet. A heat dissipating element is attached to the rotor packet. A gap seal is formed between an outer diameter of the heat dissipating element and an inner diameter of a component connected to the stator. In some examples, the component may be a coil body connected to the stator.

8 Claims, 1 Drawing Sheet

(51) Int. Cl.
  *H02K 7/14*     (2006.01)
  *H02K 21/14*    (2006.01)
(58) Field of Classification Search
  USPC .................................. 310/50, 60 R, 61, 62
  See application file for complete search history.

(56) References Cited

U.S. PATENT DOCUMENTS

| | | | |
|---|---|---|---|
| 2008/0042502 | A1 | 2/2008 | VanLuik |
| 2009/0108715 | A1 | 4/2009 | Sopp |
| 2012/0001503 | A1* | 1/2012 | Owng .................. H02K 9/225 310/54 |
| 2012/0062052 | A1 | 3/2012 | Best |

FOREIGN PATENT DOCUMENTS

| | | | | |
|---|---|---|---|---|
| DE | 102006022139 | A1 * | 11/2007 | ............... H02K 9/22 |
| DE | 102007012395 | A1 | 9/2008 | |
| DE | 102007060011 | A1 | 7/2009 | |
| DE | 102014202187 | A1 | 8/2014 | |
| DE | 212013000108 | U1 | 1/2015 | |
| DE | 102016123272 | A1 | 6/2018 | |
| EP | 0425492 | B1 | 11/1993 | |
| EP | 2429065 | A2 | 3/2012 | |
| JP | 4772298 | B2 | 9/2011 | |
| KR | 1020180061121 | A | 5/2019 | |
| WO | 2006072489 | A1 | 7/2006 | |
| WO | 2007028684 | A1 | 3/2007 | |
| WO | 2009059863 | A1 | 5/2009 | |
| WO | 2017173075 | A1 | 10/2017 | |

OTHER PUBLICATIONS

Van De Maele, Wim, "International Search Report and Written Opinion Regarding International Application No. PCT/EP2020/061740", Jul. 9, 2020, pp. 12, Published in: EP.

China Patent Office, "First Office Action", dated Apr. 28, 2024

* cited by examiner

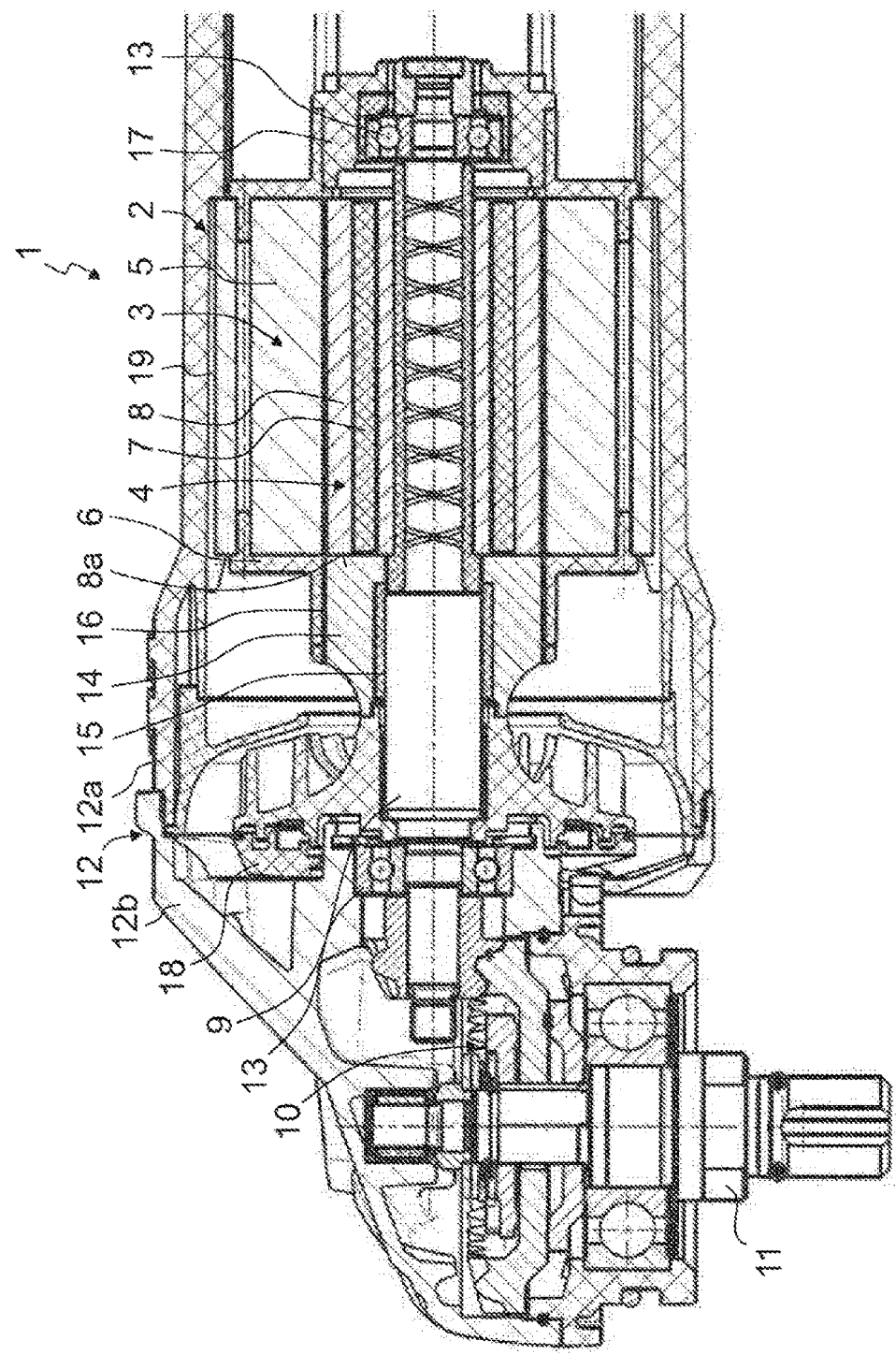

ELECTRIC MOTOR

CROSS-REFERENCE TO RELATED APPLICATIONS

The present Application for Patent claims priority to German Patent Application No. 10 2019 111 472.1 filed May 3, 2019, and assigned to the assignee hereof, which is hereby expressly incorporated by reference herein.

FIELD OF THE DISCLOSURE

The disclosure relates to an electric motor having a stator and a rotor in which overheating of the rotor is avoided.

BACKGROUND

An electric motor according to the preamble of claim 1 is known from DE 10 2007 060 011 A1. WO 2007/028684 A1 describes an electric motor having a stator and a rotor, which is connected in a rotationally fixed manner to a shaft. The shaft is mounted in a bearing, which is received in a bearing plate. Between the bearing plate and the shaft there is provided an air gap, which serves to conduct some of the heat from the rotor.

A further electric motor is known from DE 10 2016 123 272 A1.

DE 10 2014 202 187 A1 describes a similar electric motor, which is provided with a cooling unit for cooling the drive unit or the electronic unit of the electric motor.

From WO 2017/173075 A1 there is known a further brushless electric motor having a fan which is formed in one piece with the rotor packet and consists of a plastics material.

Such brushless electric motors having a rotor fitted with permanent magnets are frequently encapsulated in order to protect the rotor from contamination, in particular by metal dust, which is attracted by the permanent magnets. Owing to magnetic reversal effects in the rotor and as a result of heat transfer from the stator into the rotor, the rotor in such electric motors heats up in most cases very considerably. A particular problem thereby is that, as the output of the electric motor increases, the temperature of the rotor also increases, and the high temperatures which thereby develop within the electric motor can damage the permanent magnets. As a result of the described encapsulation of the motor and in particular of the rotor, it is very difficult to maintain the rotor at an acceptable temperature.

The solutions known from the prior art are mostly either very complex as regards the cooling of the rotor or they have inadequate encapsulation of the rotor, so that it is susceptible to contamination, which can reduce its working life.

With regard to the general prior art relating to the cooling of electric motors, reference may be made additionally to WO 2006/072 489 A1, EP 0425 492 B1, WO 2009/059 863 A1, DE 21 2013 000 108 U1 or DE 10 2007 012 395 A1. Some of these documents also describe non-brushless motors.

SUMMARY

The object of the present disclosure is to provide a brushless electric motor in which overheating of the rotor is avoided.

According to the disclosure, this object is achieved by the features mentioned in claim 1.

The heat dissipating element according to the disclosure attached to the rotor packet ensures that, as the rotor heats up during operation, the heat is reliably conducted away and overheating of the rotor is thus avoided.

The gap seal that is present between the heat dissipating element and the component connected to the stator prevents contaminants, for example metal dust, from being able to reach the rotor.

The rotor is thus encapsulated without the risk of overheating.

Because the gap seal is formed between the heat dissipating element and a coil body connected to the stator, existing components are used expediently, so that no additional outlay in terms of costs is required for forming the gap seal.

In order to be able to conduct a particularly large amount of heat away from the rotor, it can further be provided that the heat dissipating element consists of a material with high thermal conductivity.

It has been found to be particularly advantageous, on the one hand in respect of the dissipation of heat from the rotor and on the other hand in respect of a low mass of the electric motor, if the heat dissipating element consists of aluminum.

An embodiment of the disclosure that is particularly advantageous in terms of construction can consist in that the heat dissipating element is attached to a planar surface of the rotor packet.

In addition, it can be provided that the heat dissipating element is connected to a fan wheel or formed in one piece with a fan wheel. Coupling the fan wheel with the heat dissipating element results in a substantial increase in the surface area of the heat dissipating element, so that a correspondingly larger amount of heat can be conveyed away from the rotor.

This conveying of heat away from the rotor can be increased still further if the fan wheel consists of a material with high thermal conductivity.

It can further be provided that the distance between the component connected to the stator and the heat dissipating element, in order to form the gap seal, is from 0.05 to 1 mm, preferably from 0.3 to 0.6 mm. Such a size of the gap seal on the one hand prevents the ingress of contaminants into the region of the rotor and on the other hand allows air to flow through, so that cooling of the rotor is ensured.

An electric hand tool device having an electric motor according to the invention is specified in claim 8.

Such an electric hand tool, which can be in the form of an angle grinder, for example, can be operated with very high outputs owing to the above-described good conveying of heat away from the electric motor.

In order to improve the air supply within the electric hand tool device. it can further be provided that an air gap is present between the stator and a housing surrounding the stator.

Further features and advantages of the disclosure will become apparent from the following description of an exemplary embodiment of the disclosure, and from the dependent claims.

In addition, it is pointed out that terms such as "comprising", "have" or "having" do not exclude other features or steps. Furthermore, terms "a" or "the", which refer to a single number of steps or features, do not exclude a plurality of features or steps, and vice versa.

BRIEF DESCRIPTION OF THE DRAWINGS

The disclosure is described in greater detail hereinbelow with reference to the accompanying figures. The figures show multiple features of the disclosure in combination with one another. However, the person skilled in the art can, of course, consider them in isolation from one another and optionally combine them to form further expedient subcombinations without having to become inventively active.

In the figures, in schematic form:

FIG. 1 shows a section through an electric hand tool device having an electric motor, according to various aspects of the disclosure.

DETAILED DESCRIPTION

FIG. 1 shows an electric hand tool device 1, which in the present case is in the form of an angle grinder. The electric hand tool device 1 could in principle also be designed in a different way, for example as a hand drill, jigsaw or the like.

The electric hand tool device 1 has an electric motor 2, in the present case a brushless electric motor 2. The electric motor 2 in turn has a stator 3 and a rotor 4 arranged within the stator 2. The electric motor 2 is an electric motor 2 operated by the normal mains supply, which is electrically well insulated compared to an electric motor operated by means of batteries, or accumulators, so that the problems described above in respect of high temperatures of the rotor 4 are in most cases increased.

In addition to a winding 5 known per se, the stator 3 has a coil body 6 likewise known per se. The rotor 4, as is conventional in a brushless electric motor 2, is fitted with permanent magnets 7, which are surrounded, in a manner likewise known per se, by metal cover plates, or a rotor packet 8. A rotor shaft 9 extends through the rotor 4, which rotor shaft drives an output shaft 11 of the electric hand tool device 1 via a transmission 10. The rotor shaft 9 is mounted in a housing 12 of the electric hand tool device 1 by means of two bearing arrangements 13 which are spaced apart from one another. In the exemplary embodiment shown, the housing 12 of the electric hand tool device 1 is in two-part form and has a motor housing 12*a* and a transmission housing 12*b*. Assembly of the drive components of the electric hand tool device 1, in particular of the electric motor 2 with its components, the transmission 10, the output shaft 11 and the bearing arrangements 13, is thus made possible.

In the present case, a heat dissipating element 14 is attached to the rotor packet 8 of the rotor 4. The heat dissipating element 14 consists preferably of a material with high thermal conductivity, for example of aluminum, and serves to convey heat away from the rotor 4. The heat dissipating element 14 should further consist of a non-magnetizable material in order to avoid magnetic short circuits of the rotor 4. For the dissipation of heat from the rotor 4, the heat dissipating element 14, which is preferably of rotationally symmetrical form, is in the present case attached to a planar surface 8*a* of the rotor packet 8. In other words, the heat dissipating element 14 is arranged as an axial prolongation of the rotor packet 8. As a result of this arrangement of the heat dissipating element 14, the heat that develops in the rotor 4 is conveyed away via the rotor packet 8 to the heat dissipating element 14. It is, however, possible that the heat dissipating element 14 also has one or more contact surfaces with the rotor packet 8 at locations other than the planar surface 8*a*, for example in that the heat dissipating element 14 has one or more projections, which engage axially into the rotor packet 8. Furthermore, the heat dissipating element 14 can also be in multipart form, or one or more further components can be arranged between the heat dissipating element 14 and the rotor packet 8, which further components should in this case have a heat-conducting property. For example, the heat dissipating element 14 can be attached to the rotor packet 8 by a suitable, preferably heat-conducting adhesive. In the present case, an insulating material 15 is located between the heat dissipating element 14 and the rotor shaft 9, which ensures electrical insulation of the heat dissipating element 14.

The heat dissipating element 14 can also be used for balancing the rotor 4, in that depressions or similar areas of removed material are introduced into the heat dissipating element or carried out thereon.

Between the outside diameter of the heat dissipating element 14 and the inside diameter of a component connected to the stator 3, in the present case of the coil body 6, there is formed a gap seal 16, which prevents the ingress of contaminants, for example metal dust, into the region of the rotor 4 and in particular into the region of the permanent magnets 7. In order to form the gap seal 16, the distance between the component connected to the stator 3, that is to say the coil body 6, and the heat dissipating element 14 can be from 0.05 to 1 mm, preferably from 0.3 to 0.6 mm. Good sealing can thus be achieved over the length of the gap formed between the coil body 6 and the heat dissipating element 14. At the end opposite the heat dissipating element 14, the rotor 4, or the rotor packet 8, and the permanent magnets 7 are likewise encapsulated, namely in that the coil body 6 is connected to a bearing flange 17 and thus prevents the ingress of contaminants from that side too. One of the two bearing arrangements 13 is accommodated in the bearing flange 17.

Adjacent to the heat dissipating element 14 is a fan wheel 18, which is arranged on the rotor shaft 9. On the side facing the fan wheel 18, the heat dissipating element 14 is provided with an inflow geometry, which in the present case is in the form of a curved portion, which improves the inflow of air into the fan wheel 18. As a result of the flow over the surface forming the inflow geometry, good cooling of the heat dissipating element 14 is achieved. The inflow geometry of the heat dissipating element 14 thereby begins at the end of the coil body 6, which is axially shorter than the heat dissipating element 14. The air flowing through the housing 12 of the electric hand tool device 1 can thus flow past the heat dissipating element 14 in order to cool it.

In order to improve the dissipation of heat from the rotor 4 still further, the heat dissipating element 14 can be connected to the fan wheel 18. At least some of the heat given off by the rotor packet 8 to the heat dissipating element 14 is thus transmitted further to the fan wheel 18, from where it can be given off to the air flowing through the housing 12 of the electric hand tool device 1. The fan wheel 18 in this case consists preferably of a material with high thermal conductivity, for example of aluminum, and can also be used for balancing the rotor 4. The fan wheel 18 can of course also consist of plastics material.

In order to improve the flow of air through the housing 12 of the electric hand tool device 1, an air gap 19 is further provided between the stator 3 and the housing 12. The air flowing through this air gap 19 reaches the heat dissipating element 14 directly, so that the heat can be conveyed away therefrom.

The invention claimed is:

1. An electric motor having a stator and a rotor, wherein the rotor is fitted with permanent magnets, and wherein the permanent magnets are surrounded by a rotor packet, the rotor packet attached to a heat dissipating element, wherein a gap seal is formed between an outside diameter of the heat dissipating element and an inside diameter of a coil body connected to the stator, and wherein a distance between the coil body connected to the stator and the heat dissipating element to form the gap seal is anywhere between 0.05 mm and 1 mm.

2. The electric motor of claim 1, wherein the heat dissipating element is composed of a material with high thermal conductivity.

3. The electric motor of claim 2, wherein the heat dissipating element is composed of aluminum.

4. The electric motor of claim 1, wherein the heat dissipating element is attached to a planar surface of the rotor packet.

5. The electric motor of claim 1, wherein the heat dissipating element is connected to or formed in one piece with a fan wheel.

6. The electric motor of claim 5, wherein the fan wheel is composed of a material with high thermal conductivity.

7. An electric hand tool device, comprising:
an electric motor, the electric motor comprising:
a stator;
a coil body connected to the stator;
a rotor fitted with permanent magnets, wherein the permanent magnets are surrounded by a rotor packet, and wherein the rotor packet is attached to a heat dissipating element; and
a gap seal formed between an outside diameter of the heat dissipating element and an inside diameter of the coil body connected to the stator, wherein the gap seal is formed between the heat dissipating element and the coil body connected to the stator, and wherein a distance between the coil body connected to the stator and the heat dissipating element to form the gap seal is anywhere between 0.05 mm and 1 mm.

8. The electric hand tool device of claim 7, further comprising:
a housing surrounding the stator; and
an air gap between the stator and the housing surrounding the stator.

\* \* \* \* \*